(12) United States Patent
Choi

(10) Patent No.: US 9,100,106 B2
(45) Date of Patent: Aug. 4, 2015

(54) METHOD AND APPARATUS FOR CONFIGURING LOW POWER NETWORK

(75) Inventor: Hyun-Kuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 13/588,280

(22) Filed: Aug. 17, 2012

(65) Prior Publication Data

US 2013/0044789 A1 Feb. 21, 2013

(30) Foreign Application Priority Data

Aug. 19, 2011 (KR) ........................ 10-2011-0082743

(51) Int. Cl.
*H04L 27/00* (2006.01)
*H04B 1/707* (2011.01)

(52) U.S. Cl.
CPC ...................................... *H04B 1/707* (2013.01)

(58) Field of Classification Search
CPC ... H04L 1/0003; H04L 1/0071; H04L 5/0007; H04B 1/707; H04J 13/10
USPC .................................................. 375/146, 295
See application file for complete search history.

(56) References Cited

U.S. PATENT DOCUMENTS 8,345,535 B2 * 1/2013 Lee et al. ...................... 370/210
8,693,306 B2 * 4/2014 Hwang et al. ................. 370/204

* cited by examiner

*Primary Examiner* — Ted Wang
(74) *Attorney, Agent, or Firm* — Jefferson IP Law, LLP

(57) ABSTRACT

A transmitter for Electric Field Communication (EFC) is provided. The transmitter includes a preamble code generator, a preamble symbol generator, and a transmission electrode. The preamble code generator masks each of at least two repetitive preamble codes so that information indicating broadcast information is included in the at least two repetitive preamble codes. The preamble symbol generator multiplies a spreading code to spread the masked at least two repetitive preamble codes and generate preamble symbols. The transmission electrode transmits the preamble symbols. Since additional information transferred based on the size of a correlation value of a preamble symbol is used, a broadcast frame can be retrieved even when all packets inside a superframe are not demodulated.

10 Claims, 8 Drawing Sheets

NO MASK

| GOLD CODE[0:127] |
|---|

MASKED CODE

| GOLD CODE[0:63] | ALL '1' |
|---|---|

FIG.5

METHOD AND APPARATUS FOR CONFIGURING LOW POWER NETWORK

PRIORITY

This application claims the benefit under 35 U.S.C. §119 (a) of a Korean patent application filed on Aug. 19, 2011 in the Korean Intellectual Property Office and assigned Serial No. 10-2011-0082743, the entire disclosure of which is hereby incorporated by reference.

BACKGROUND OF THE INVENTION

1. Field of the Invention

The present invention relates to a low power network. More particularly, the present invention relates to a method and an apparatus for configuring a low power network.

2. Description of the Related Art

As wireless communication technology is developed, communication devices are miniaturized, and manufacturing costs are reduced, various technologies have emerged including Wireless Body Area Network (WBAN) technology, Wireless Local Area Network (WLAN) technology, wireless sensor network technology, and Wireless Personal Area Network (WPAN) technology. As a social interest for progressing to a society with ubiquitous communications increases and a study thereof continues, the above-mentioned wireless communication technologies are expected to play an important role. In particular, the WBAN has appeared together with an attempt for combining medical technology with Information Technology (IT) for healthcare, remote medical services, diagnostics, medical treatments, etc. An interest and a demand for the combination of IT with medical technology is a driving force for various standardizations by the Institute of Electrical and Electronics Engineers (IEEE) 802.15.6 Body Area Network (BAN) Task Group.

Since it is not easy to recharge or replace a battery of a WBAN apparatus transplanted inside a human body, there is a need for a technology that reduces power consumption and thereby extends the operational life of the WBAN apparatus. In a WBAN standard, a low power physical layer technology for communication such as modulation/demodulation methods and a low power Media Access Control (MAC) layer technology for network control are being studied.

Meanwhile, to access a network, the WBAN apparatus decodes all packets inside a network and retrieves a broadcast frame. However, to retrieve the broadcast frame, the WBAN apparatus demodulates two times more data in a superframe than the amount of data corresponding to the broadcast frame. After that, the WBAN apparatus requests a network master to allocate a dedicated frame via the retrieved broadcast frame.

For example, for accessing a network, in the case where the number of frames inside one superframe is 256, the WBAN apparatus demodulates 512 frames at a maximum and determines information to ascertain whether a frame is a broadcast frame and whether a master node may be requested to allocate a frame. Here, since the WBAN apparatus should demodulate all frames inside a superframe to detect a broadcast frame, a lot of power is consumed.

Therefore, a need exists for a method and an apparatus for reducing power consumption when configuring a low power network.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for reducing power consumption when configuring a low power network.

Another aspect of the present invention is to provide a method and an apparatus for transferring additional information using a correlation value of a preamble repeatedly transmitted in a low power network.

In accordance with an aspect of the present invention, a transmitter for Electric Field Communication (EFC) is provided. The transmitter includes a preamble code generator for masking each of at least two repetitive preamble codes so that information indicating broadcast information is included in the at least two repetitive preamble codes, a preamble symbol generator for multiplying a spreading code to spread the masked at least two repetitive preamble codes and generate preamble symbols, and a transmission electrode for transmitting the preamble symbols.

In accordance with another aspect of the present invention, a receiver for EFC is provided. The receiver includes a reception electrode for receiving a baseband signal via an electric field, a determination unit for converting the baseband signal to a bit line, a detector for extracting at least two preamble symbols included in the baseband signal to determine a correlation size of the preamble signal, and a controller for determining whether a frame is a broadcast frame based on correlation sizes of the at least two preamble signals, and for, when the frame is the broadcast frame, requesting dedicated frame allocation via the broadcast frame.

In accordance with still another aspect of the present invention, a transmission method for EFC is provided. The method includes masking each of at least two repetitive preamble codes so that information indicating broadcast information is included in the at least two repetitive preamble codes, multiplying a spreading code to spread the masked at least two repetitive preamble codes and generate preamble symbols, and transmitting the preamble symbols.

In accordance with further another aspect of the present invention, a reception method for EFC is provided. The method includes receiving a baseband signal via an electric field, converting the baseband signal to a bit line, extracting at least two preamble symbols included in the baseband signal to determine a correlation size of the preamble signal, determining whether a frame is a broadcast frame based on correlation sizes of the at least two preamble signals, and when the frame is the broadcast frame, requesting dedicated frame allocation via the broadcast frame.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 5 is a view illustrating examples of an unmasked signal and a masked signal according to an exemplary embodiment of the present invention;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for configuring a low power network.

In the following description, the low power network denotes an Institute of Electrical and Electronics Engineers (IEEE) 802.15.6 Body Area Network (BAN). Herein, for convenience in explanation, Electric Field Communication (EFC) or Near Field Communication (NFC) may be interchangeably referred to with the BAN.

Figure 1:
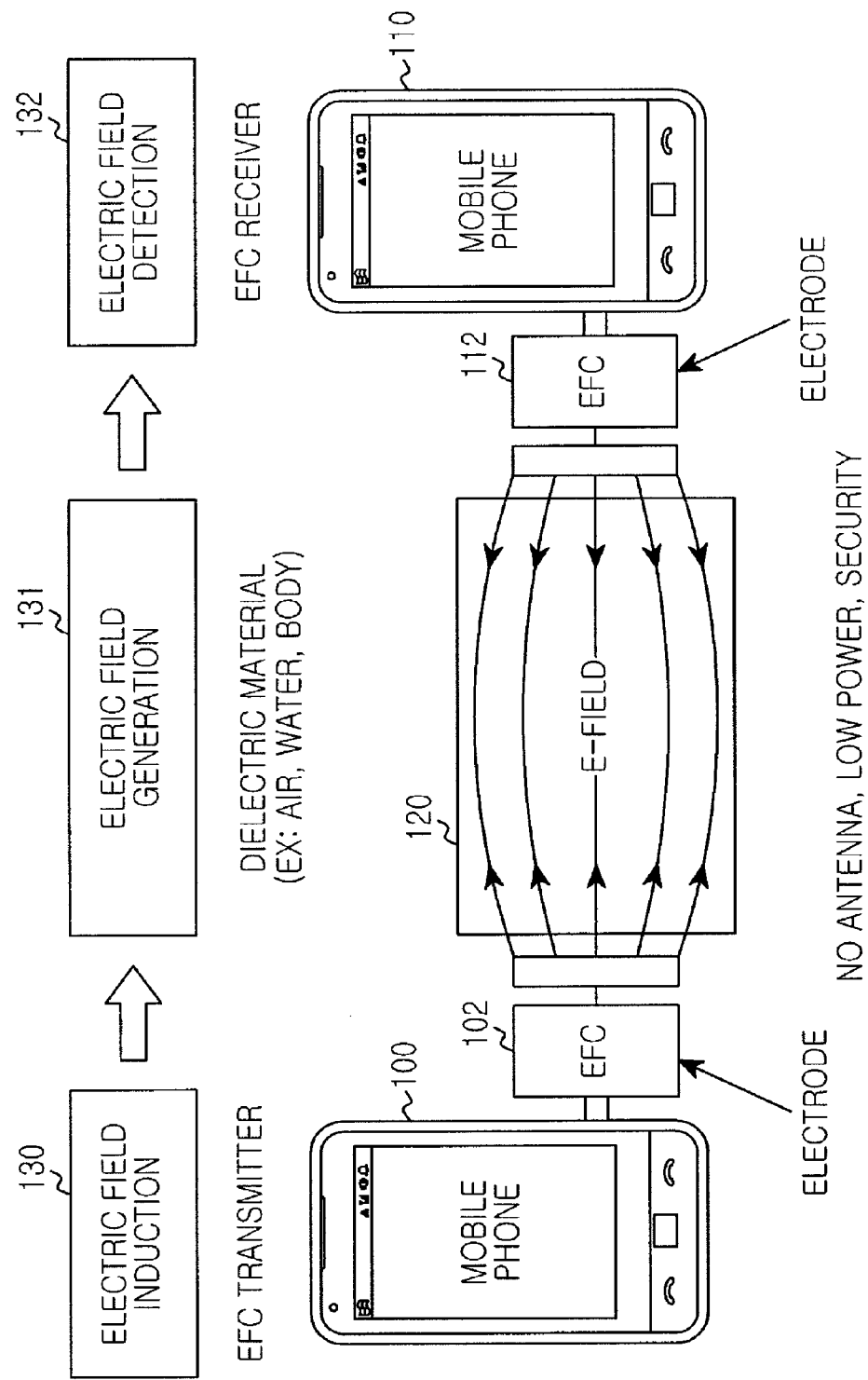
FIG. 1 is a view illustrating a low power network configuration according to an exemplary embodiment of the present invention.

FIG. 1 is a view illustrating a low power network configuration according to an exemplary embodiment of the present invention.

Referring to FIG. 1, mobile phones 100 and 110 are shown that include EFC electrodes 102 and 112, respectively, which communicate through a dielectric material 120 via an electric field. Mobile phone 100 is functioning as an EFC transmitter to induce the electric field in operation 130 so that the generated electric field is transferred in operation 131 via the dielectric material 120. In operation 132, mobile phone 110 is functioning as an EFC receiver to detect the electric field transferred via the dielectric material 120. The dielectric material 120 may be air, water, a human body, etc.

That is, the mobile phone 100 functioning as the EFC transmitter and the mobile phone 110 functioning as the EFC receiver communicates data using an electric field induction method or communicates data using a capacitive coupling method that uses the dielectric material 120. In a case of using a human body as the dielectric material 120, a dielectric constant is 300-500 times higher compared to the case of using air, so that when the human body is used, a transmission distance may be extended. Since modulation using a carrier frequency or an antenna is not used, the EFC transmitter and EFC receiver can be easily mounted to a portable apparatus and a mobile apparatus.

Figure 2:
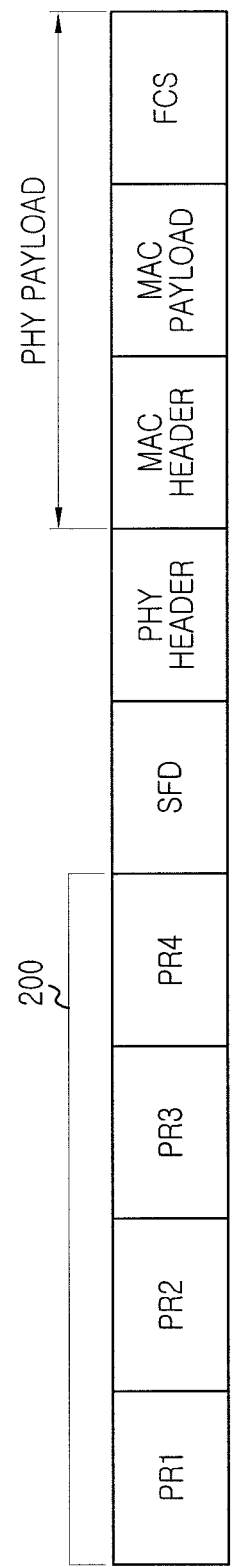
FIG. 2 is a view illustrating a packet structure according to an exemplary embodiment of the present invention.

FIG. 2 is a view illustrating a packet structure according to an exemplary embodiment of the present invention.

Referring to FIG. 2, a packet includes four preamble symbols 200, a Start Frame Delimiter (SFD), a Physical layer header (PHY header), a Media Access Control (MAC) header, an MAC payload, and a Frame Check Sequence (FCS).

Figure 3:
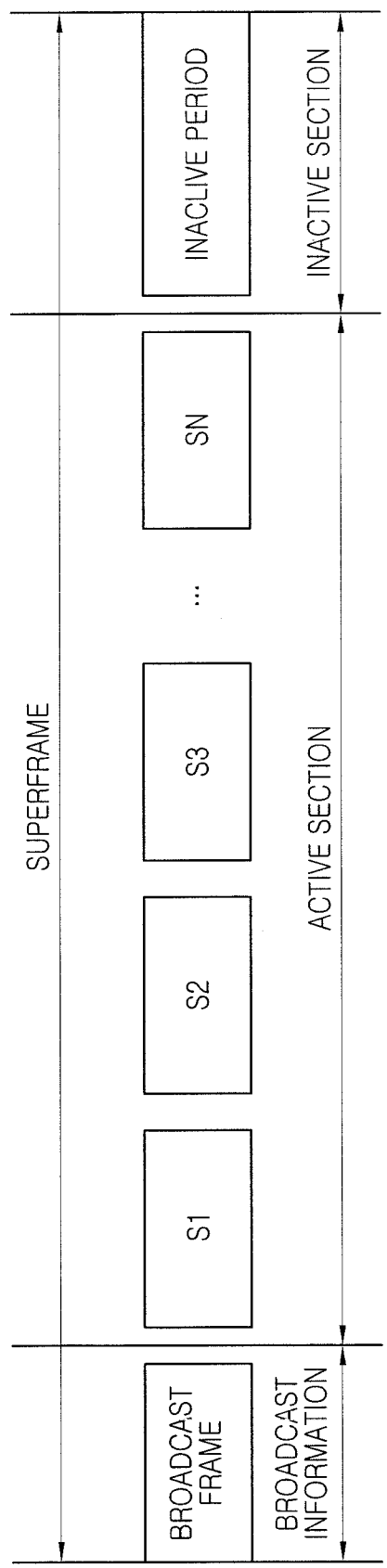
FIG. 3 is a view illustrating a superframe structure according to an exemplary embodiment of the present invention.

FIG. 3 is a view illustrating a superframe structure according to an exemplary embodiment of the present invention.

Referring to FIG. 3, a plurality of packets, such as the packet of FIG. 2, together forms one superframe. The superframe is divided into a section for transferring broadcast information, an active section, and an inactive section. The section for transferring the broadcast information includes at least one packet, and the inactive section includes a plurality of packets. Packet transmission is not performed in the inactive section.

Meanwhile, to enter a low power network, a node should demodulate all packets during two superframe sections to find a broadcast frame section, and then request a network master to allocate a dedicated frame using the broadcast frame.

For example, in the case where the number of frames or packets inside a superframe is 256, a node should demodulate 512 frames or packets at the maximum and determine information in order to find the broadcast frame.

Therefore, to minimize power, exemplary embodiments of the present invention may mask a preamble code to determine a correlation value of four preamble symbols, thereby informing whether a relevant packet is a broadcast frame based on the correlation value of the four preamble symbols. At this point, the node may reduce power consumption by determining whether the relevant packet is a broadcast frame and then demodulating only the relevant packet without needing to demodulate all packets.

Figure 4:
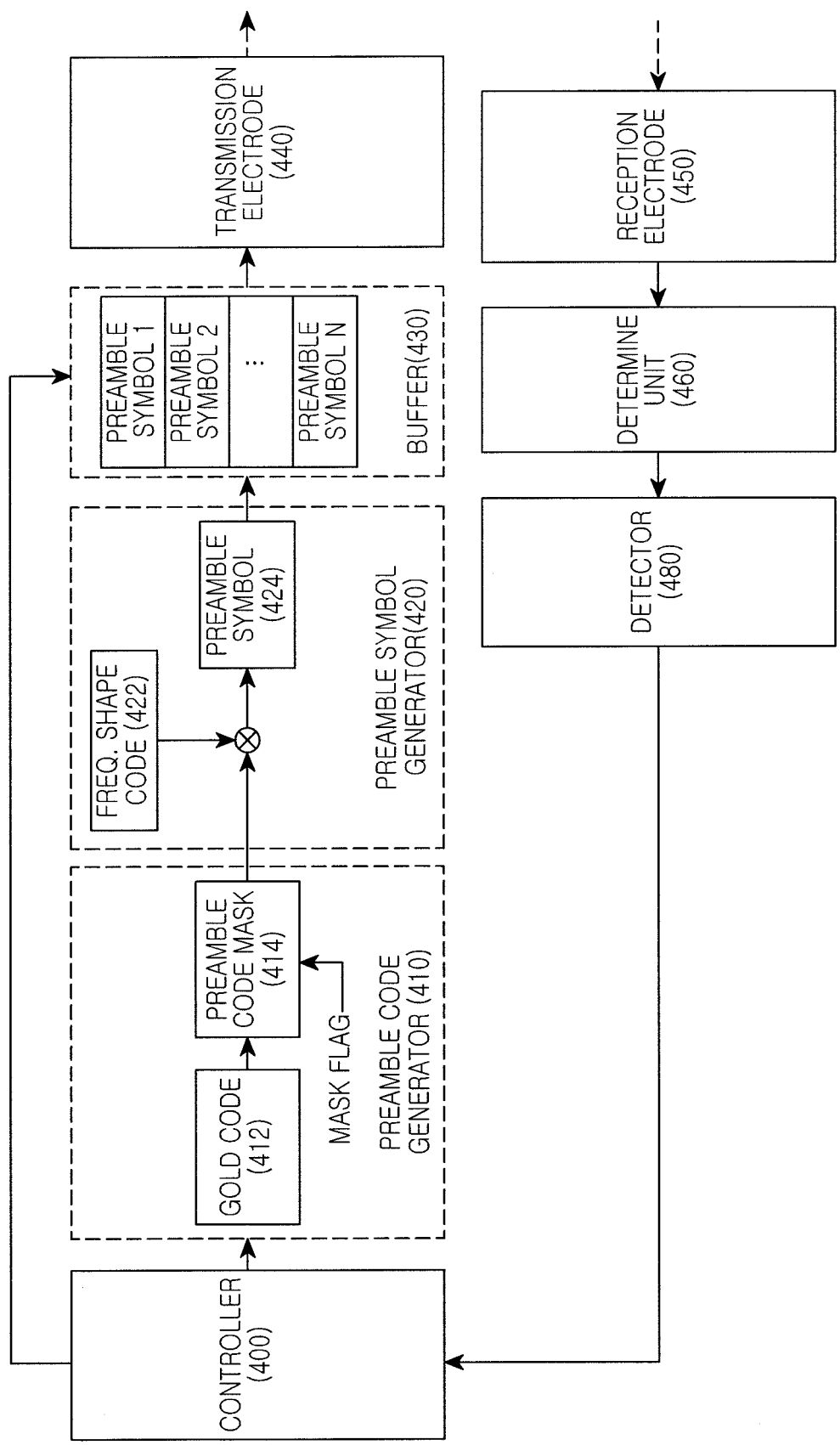
FIG. 4 is a block diagram illustrating a transmitter/receiver of a low power network according to an exemplary embodiment of the present invention.

FIG. 4 is a block diagram illustrating a transmitter/receiver of a low power network according to an exemplary embodiment of the present invention.

Referring to FIG. 4, the transmitter includes a controller 400, a preamble code generator 410, a preamble symbol generator 420, a buffer 430, and a transmission electrode 440. The receiver includes a reception electrode 450, a determination unit 460, and a detector 480.

The controller 400 controls an overall operation of the transmitter/receiver. In particular, according to the present exemplary embodiment, the controller 400 determines masking of a preamble code to provide the relevant mask value to the preamble code generator 410.

The preamble code generator 410 includes a gold code generator 412 for generating a gold code and a masking unit 414 for masking a preamble code. That is, the preamble code generator 410 receives a masking flag value indicating whether to mask a preamble code and a mask value from the controller 400, and masks a preamble code and provides the same to the preamble symbol generator 420 as illustrated in FIG. 5. FIG. 5 is discussed further below.

The preamble symbol generator 420 receives a masked preamble code or an unmasked preamble code from the preamble code generator 410 to generate a preamble symbol. That is, the preamble symbol generator 420 includes a Frequency Shape Code (FSC) generator 422 for determining a transmission rate and a preamble symbol determination unit 424. The FSC maps n bits to m bits using a spreading coefficient (m>n). That is, the preamble code is multiplied by the FSC, so that it becomes a preamble symbol. Here, 1 symbol is formed of predetermined bits.

The buffer 430 stores a preamble symbol formed by multiplying a preamble code by the FSC from the preamble symbol generator 420. Also, the buffer 430 receives a data symbol from the controller 400 to store data for configuring a packet of FIG. 2 and a superframe of FIG. 3.

The transmission electrode 440 transmits a data symbol and a preamble symbol stored in the buffer 420 via an electric field in baseband.

The reception electrode 450 receives a baseband signal via the electric field to provide the same to the determination unit 460.

The determination unit 460 converts the baseband signal to a bit line via a matched filter. That is, the determination unit 460 determines 0 or 1 from the baseband signal to provide a result thereof to the detector 480.

The detector 480 receives bit line information which has been converted from the baseband signal by the determination unit 460 and separates the bit line information into a preamble symbol and a data symbol, which is provided to the controller 400. Meanwhile, the detector 480 determines correlation values for preamble symbols, respectively, repeated as in FIG. 2 to provide them to the controller 400. Depending on the implementation, after the preamble symbol is converted to a preamble code using a despreading coefficient corresponding to the FSC of the transmitter, a correlation value may be determined for the preamble code.

The controller 400 determines whether a relevant packet is broadcast information based on a preamble correlation value from the detector 480 to determine whether to demodulate a payload portion of the packet.

As described above, referring to the transmitter/receiver of the low power network illustrated in FIG. 4, the transmitter/receiver of the low power network can perform digital modulation on a baseband signal and then transmit the signal without modulation using a carrier frequency. Since a transmission signal is transmitted via a baseband, the receiver does not require a transmission/reception antenna and a mixer, a Phase Locked Loop (PLL), etc. for modulating/demodulating a Radio Frequency (RF) carrier.

FIG. 5 is a view illustrating examples of an unmasked signal and a masked signal according to an exemplary embodiment of the present invention.

Referring to FIG. 5, a preamble code is generated based on a 128-bit gold code, and an unmasked preamble code is used for other packets except a packet for broadcasting.

Meanwhile, a portion (e.g., 64 bits to 127 bits) of the preamble code generated based on a 128-bit gold code is masked with "1" (referred to as a masked preamble code), so that the masked preamble code is used for a packet for broadcasting. Depending on the implementation, a portion of the preamble code generated based on a 128-bit gold code may be masked with "0", and a 128-bit specific bit pattern (10101010 . . . 101010101) and a 128-bit preamble code may be masked (for example, an exclusive OR operation or an OR operation is performed on a 128-bit specific bit pattern and a 128-bit preamble code).

Figure 6:
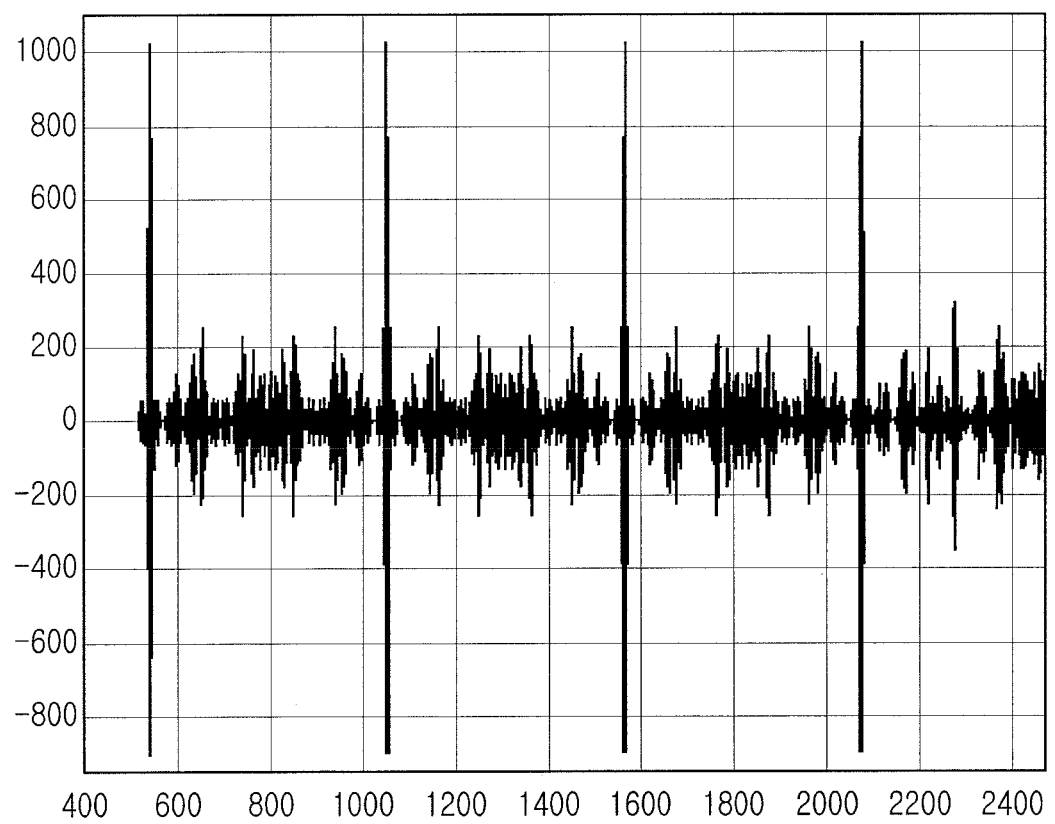
FIG. 6 is a graph illustrating a correlation value of a preamble signal according to an exemplary embodiment of the present invention.

FIG. 6 is a graph illustrating a correlation value of a preamble signal according to an exemplary embodiment of the present invention.

Referring to FIG. 6, a correlation value of a preamble signal unmasked by a reception end is illustrated. In the case where the four preamble symbols of FIG. 2 are repeatedly transmitted, four peak values of the same size exist.

In contrast, in the case where preamble codes are masked with different values with respect to the four preamble codes, four peak values of different sizes exist (not shown).

Figure 7:
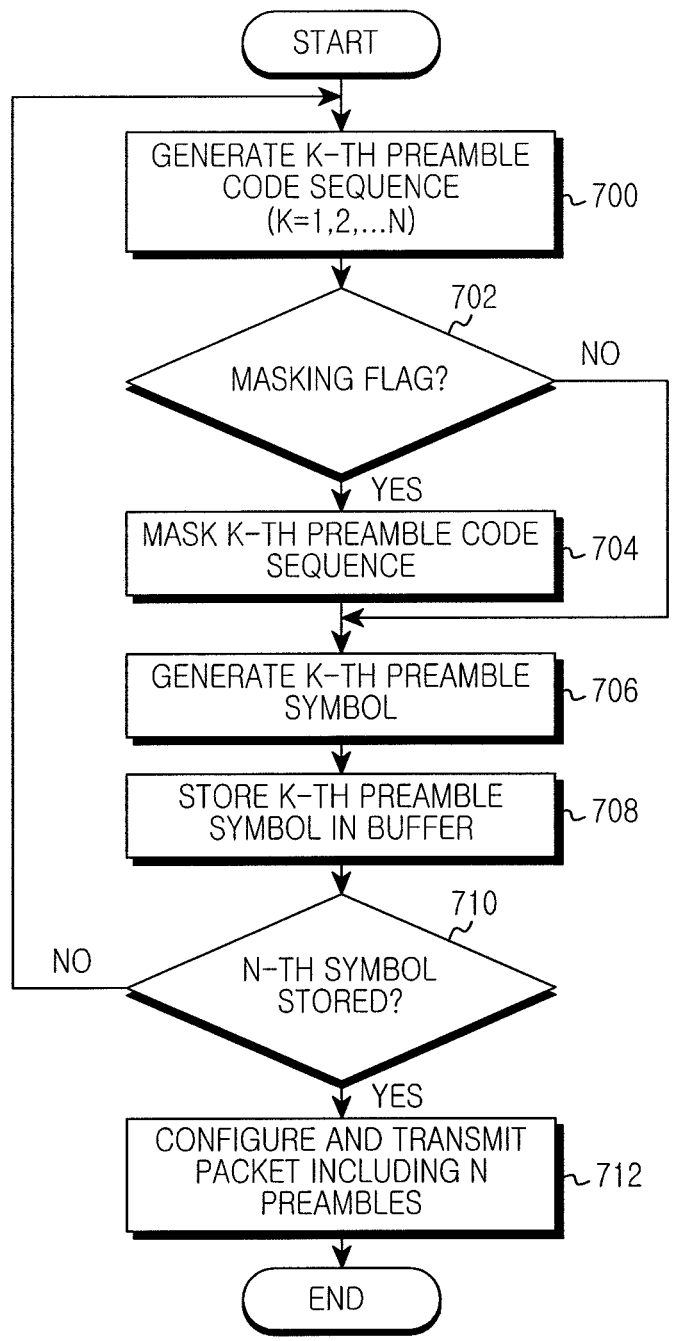
FIG. 7 is a flowchart illustrating a transmission method for configuring a low power network according to an exemplary embodiment of the present invention.

FIG. 7 is a flowchart illustrating a transmission method for configuring a low power network according to an exemplary embodiment of the present invention.

Referring to FIG. 7, the transmitter generates a K-th preamble code based on a gold code in step 700, and determines whether a masking flag has been set with respect to the K-th preamble code in step 702. That is, the transmitter determines whether to mask a portion or entirety of the K-th preamble code.

When the masking flag has been set, the transmitter proceeds to step 704 to mask a portion or entirety of the K-th preamble code. That is, the preamble code is masked using an XOR or OR operation with a 128-bit specific bit pattern or an M-bit (M is an integer less than 128 bits) specific bit pattern.

After that, or when the masking flag has not been set, the transmitter multiplies a preamble code by an FSC to generate a K-th preamble symbol in step 706 and stores the K-th preamble symbol in a buffer in step 708.

The transmitter determines whether an N-th preamble symbol has been stored in step 710. When the N-th preamble symbol has not been stored, the transmitter returns to step 700. When the N-th preamble symbol has been stored, the transmitter proceeds to step 712. N is the number of preamble symbols repeated in a packet. That is, N preamble symbols are masked with the same or different bit patterns. Also, in step 700, the N preamble codes may be the same preamble codes or different preamble codes.

The transmitter configures a packet including the masked N preambles and transmits the same in step 712.

After that, the transmitter ends the procedure of the present exemplary embodiment.

Figure 8:
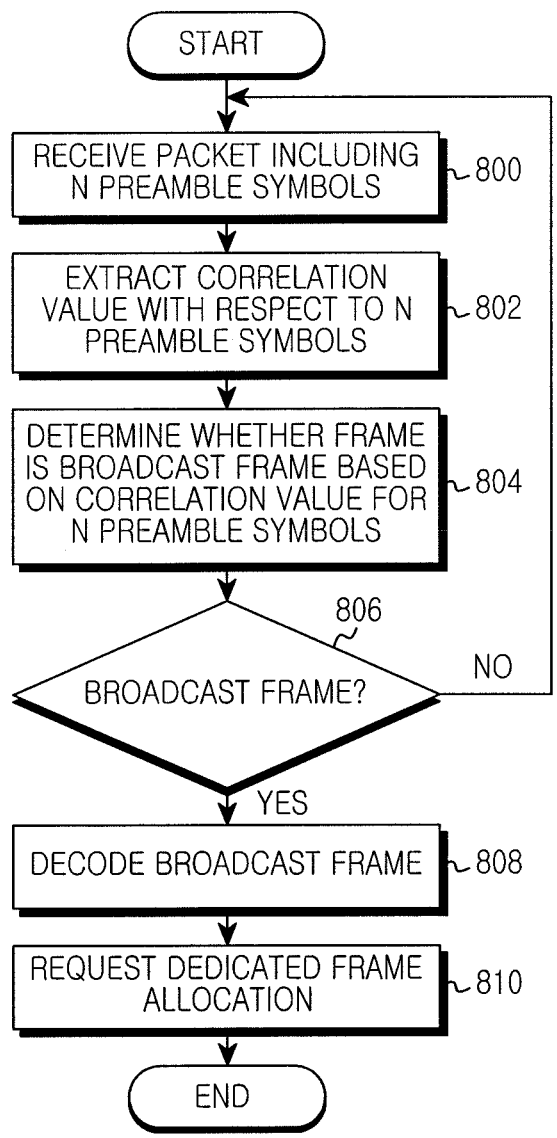
FIG. 8 is a flowchart illustrating a reception method for configuring a low power network according to an exemplary embodiment of the present invention.

FIG. 8 is a flowchart illustrating a reception method for configuring a low power network according to an exemplary embodiment of the present invention.

Referring to FIG. 8, a receiver receives a packet including masked N preambles from a transmitter in step 800, and extracts a correlation value with respect to masked N preamble symbols in step 802.

The receiver determines whether a current packet is a broadcast frame based on the correlation value for the N preamble symbols in step 804.

When the current packet is not the broadcast frame in step 806, the receiver returns to step 800.

In contrast, when the current packet is the broadcast frame in step 806, the receiver proceeds to step 808 to decode the broadcast frame and proceeds to step 810 to request allocation of a dedicated frame via the broadcast frame.

After that, the receiver ends the procedure of the present exemplary embodiment.

As described above, the preamble structure of the EFC is detected using periodicity of a correlation value when one preamble symbol is repeatedly received four times as in FIG.

2. When a preamble symbol value is controlled in the repeated preamble structure, the size of the correlation value is controlled.

The transmitter may mask a preamble symbol to control the size of a correlation value detected by the receiver and transfer additional information using the correlation value of the preamble symbol. Since four symbols are transmitted in the present exemplary embodiments, the number of cases of 24=16 can be obtained. In this case, 1111 and 0000 cannot be discriminated, so that they are excluded.

Meanwhile, when performing a network entry, a new node should demodulate all packets transmitted during two times a greater section of a superframe at the minimum to obtain network information and perform network entry.

According to the present exemplary embodiments, when a new node enters a network, a reception end can determine whether a packet is a broadcast frame based on a correlation value of a preamble symbol, and demodulation of unnecessary packets (i.e., other packets except for the broadcast packet) is prevented, so that a low power operation is possible.

Assuming that the length of a preamble is A, the length of a header and a payload corresponds to 100 A at a minimum. Since 256 frames of a superframe can be allocated at a maximum, according to the related art, a new node should demodulate data as much as the length of 256*101 A when performing a network entry. However, when a method proposed by the present exemplary embodiments is used, a new node demodulates data as much as a section of 256*(A)+100 A when entering a network. Therefore, the present exemplary embodiments can reduce power consumption used for obtaining network information when entering a network to 2% or less compared to the related art.

As described above, according to the present exemplary embodiments, a preamble code repeatedly transmitted in one packet is masked and transmitted, so that a correlation value of a preamble symbol is controlled and additional information indicating that a relevant packet is a broadcast frame can be transferred. Also, since additional information transferred based on the size of a correlation value of a preamble symbol is used, a broadcast frame can be retrieved even when all packets inside a superframe are not demodulated.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described exemplary embodiments but should be determined by not only the appended claims but also the equivalents thereof.

What is claimed is:

1. A transmitter for Electric Field Communication (EFC), the transmitter comprising:
    a preamble code generator for masking each of at least two repetitive preamble codes so that information indicating broadcast information is included in the at least two repetitive preamble codes;
    a preamble symbol generator for multiplying a spreading code to spread the masked at least two repetitive preamble codes and generate preamble symbols; and
    a transmission electrode for transmitting the preamble symbols.

2. The transmitter of claim 1, wherein the information indicating the broadcast information is determined by a combination of correlation values of the masked at least two repetitive preamble codes.

3. The transmitter of claim 1, further comprising a controller for determining whether information to transmit is the broadcast information and when the information to transmit is the broadcast information, providing a mask value to the preamble code generator.

4. The transmitter of claim 1, wherein the transmission electrode transmits a baseband signal via an electric field.

5. The transmitter of claim 1, wherein at least a portion of the masked at least two repetitive preamble codes is changed by a mask value.

6. A transmission method of a transmitter for Electric Field Communication (EFC), the method comprising:
    masking, by the transmitter, each of at least two repetitive preamble codes so that information indicating broadcast information is included in the at least two repetitive preamble codes;
    multiplying a spreading code to spread the masked at least two repetitive preamble codes and generate preamble symbols; and
    transmitting the preamble symbols.

7. The method of claim 6, wherein the information indicating the broadcast information is determined by a combination of correlation values of the masked at least two repetitive preamble codes.

8. The method of claim 6, further comprising:
    determining whether information to transmit is the broadcast information; and
    when the information to transmit is the broadcast information, determining a mask value.

9. The method of claim 6, wherein a packet is transmitted as a baseband signal via an electric field.

10. The method of claim 6, wherein at least a portion of the masked at least two repetitive preamble codes is changed by a mask value.

* * * * *